Figure 1:
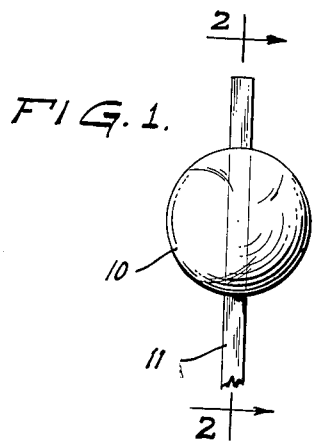

Sept. 25, 1962     J. R. FAHEY ET AL     3,056,074
MINIATURE DESICCATOR AND PRODUCTION OF UNITS THEREOF
Original Filed Nov. 3, 1960

INVENTORS
GEORGE L. SCHNABLE
JOHN RUSSELL FAHEY
BY
F. D. Prager
ATTORNEY

United States Patent Office 3,056,074
Patented Sept. 25, 1962

3,056,074
MINIATURE DESICCATOR AND PRODUCTION OF UNITS THEREOF
John Russell Fahey and George L. Schnable, Lansdale, Pa., assignors, by mesne assignments, to Philco Corporation, Philadelphia, Pa., a corporation of Delaware
Continuation of application Ser. No. 67,071, Nov. 3, 1960. This application Dec. 16, 1960, Ser. No. 91,292
15 Claims. (Cl. 317—234)

This invention relates to means for the removal of contaminating humidity from a highly purified atmosphere, particularly from the atmosphere in a transistor housing. More especially the invention has to do with the construction and production of means for dehumidifying such an atmosphere and for also avoiding other contamination thereof. This application is a continuation of an application presenting the identical disclosure and claims and which has been filed by the undersigned on November 3, 1960, under Serial No. 67,071, now abandoned.

A variety of humidity absorbing or so-called desiccant materials or "getters" are known, including products of extremely high porosity and correspondingly high desiccating effect. However, attempts to use such products in a transistor capsule or the like have thus far met with serious trouble.

We have found that the trouble was due to a certain side effect of the required high degree of porosity. The porosity of the small body used as a desiccator, together with the required physical holding of such body, caused the occasional breaking loose of minute fragments of desiccant and the consequent formation of microscopic or submicroscopic particles of "getter dusts." Such particles can contaminate a sensitive transistor even when humidity is most effectively absorbed by the getter substance.

It is an object of our invention to provide a desiccant unit and a method of producing it, overcoming the difficulty which has been outlined. Another object is to make the unit small enough to fit a miniature housing, such as a transistor shell and also to make it inexpensive.

We have provided such a unit by forming a new combination of vitreous granule and metallic filament structures. The vitreous granule or grain has highly siliceous, highly porous surface material, which can be made extremely desiccating or "thirsty," while the same granule advantageously has a siliceous, non-porous inner core. Phase-separated boro-silicate can be used to provide such a core and such a surface portion or shell, in the desired miniaturized format. The filament or support consists of a wire or strip of tungsten or the like which extends through the core and is firmly bonded to the same, while having an end or preferably ends extending from the granule and attached to the inside of the transistor housing.

Contamination by solid particles as well as by humidity has thus been avoided, while the means employed for this purpose have been kept small enough to avoid any need for larger transistor capsules. In addition both the fabricating method and the product thereof are very simple and inexpensive.

Figure 2:
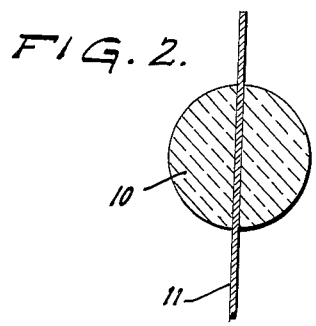
Figure 3:
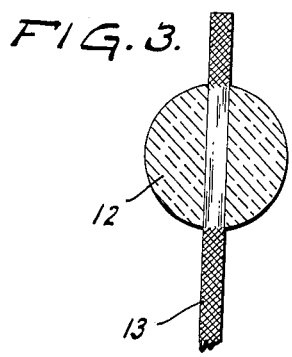
Figure 4:
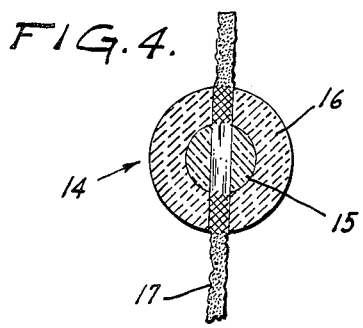
Figure 6:
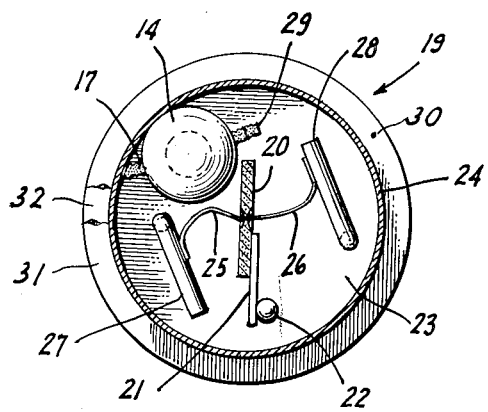
Figure 5:
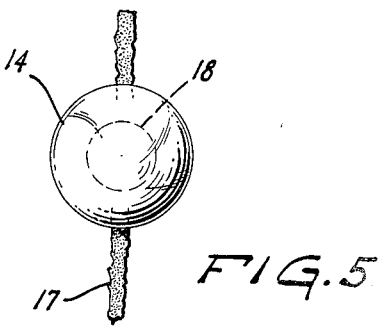

Other advantages, features and objects of the invention may be noted from the following detailed description, together with the drawing, wherein successive phases of the manufacturing process are illustrated schematically. FIGURE 1 is an elevational and greatly enlarged view of the granule and filament in an early phase of the process. FIGURE 2 is a sectional view taken along line 2—2 in FIGURE 1. FIGURE 3 is a cross-sectional view taken in a plane normal to that of FIGURE 2 and wherein the granule and filament are shown in a subsequent phase of the process. FIGURE 4 is a sectional view of the completed desiccant unit, oriented as in FIGURE 3. FIGURE 5 is an elevational view of this unit. FIGURE 6 is a plan view of a transistor housing with the desiccant unit installed therein, upper parts of the housing being cut off to disclose the inside. The scale of this last figure is closer to actual size than is that of the other figures, but it is still enlarged several times.

An initial phase of the new manufacturing process is illustrated by FIGURES 1 and 2. A small, approximately spherical grain or granule 10 of glass has been cast onto or sealed around a metal filament, shown as a strip 11. The glass is advantageously of the borosilicate type ($SiO_2+B_2O_3$), containing a small amount of alkali (for instance soda $Na_2O$). Filament 11 is preferably made of tungsten (W) and we have found that few other materials are usable substitutes for this metal. Tantalum (Ta) can be used instead of tungsten but a heavier filament is then required for equal strength of the unit, thereby making the entire unit larger. Molybdenum (Mo) is successful only when special precautions are applied, as will be described hereinafter, which add to the cost of the fabricating process. Filaments of other noble metals such as platinum, gold and the like are too soft for our purposes, and most of the latter metals would become useless by melting or by chemical attack, in the required high-temperature treatment of the glass, to be described presently.

It is not necessary to describe or illustrate preliminary phases of this treatment, such for instance as the combining of constituents of the borosilicate glass, nor is it necessary to illustrate or describe the apparatus used for such purposes, which can be built and operated in ways known to persons skilled in that art. It will be understood that granule 10 is formed by brief application of a fusing temperature, high enough to melt the glass components but low enough to leave the filament solid.

The grain of glass, having been fused, is exposed to phase separation of silica-rich and boron-alkali-rich constituents, by a further heat treatment, the temperature of which is lower than that in the fusion process but the duration of which is much longer. The visible result of the phase separation is that a formerly transparent glass grain becomes opalescent. The physical result is that the glass is converted from the above-mentioned borosilicate compound into a body 12 (FIGURE 3) which substantially consists of a lattice or "skeleton" of silica ($SiO_2$), having minute interstices which are filled with boron oxide ($B_2O_3$) and alkali. The phase-separated body is still firmly bonded to the metal filament.

This firmly bonded condition is important in view of serious problems of selection of materials for the combined metal filament and glass grain. The borosilicate glass is the only known product, capable of being sealed to metal, which can be made so extremely porous and thirsty as is desired for maximum miniaturization of the desiccant unit. Its preparation and use requires that vitreous matter be exposed to conditions whereunder most other materials would fail for one reason or other. We have already mentioned that most of the noble metals, for instance, would fail. So far as we have been able to find, the only suitable filament materials belong to the group consisting of tungsten, tantalum, columbium (niobium) and molybdenum. Tungsten is preferred because of its physical and chemical ruggedness.

It will be seen that selection and matching of glass and metal constituents for the new unit cannot be such as to select optimum conditions for uniformity of thermal expansion and contraction. It is therefore possible and somewhat likely that the bond between the glass grain and the filament might be rather poor if the unit were simply cooled after its fusion. According to the invention, however, the phase separating treatment at an elevated but relatively mild temperature is applied.

The phase separating treatment is performed by baking the unit for a number of hours. So far as the glass is concerned the atmosphere in the baking furnace can be ordinary air. In that event the baking results not only in producing the above-mentioned opalescence of the glass but also in some oxidation or corrosion of the exposed ends 13 of the filament.

Next, a surface portion of the granule 14 (FIGURE 4) is converted into a porous "skin" or shell 16, while an inner core 15 of the granule is left in solid (non-porous) condition in accordance with the invention. For this purpose the unit is immersed in a proper etching solution, for a suitably limited time, the type and strength of the solution being chosen so that it dissolves and leaches out the boron and sodium compounds which have been phase separated in the preceding treatment. This leaves minute interconnected pores in the remaining silica structure or lattice.

Pursuant to rinsing in water and final baking in a vacuum, the porosity, desiccant effects and mechanical cohesion or strength of the so obtained glass grain unit are very satisfactory. A grain 14, small enough to fit into a typical transistor capsule, can readily be treated so that a shell 16 of minute size, for instance of less than 40 mil diameter, provides a developed pore surface area of several square feet, the pores measuring only a few milli-microns in width.

The resulting desiccant grain 14, accordingly, consists of a non-porous, phase separated borosilicate glass core 15, firmly bonded to filament 17 and with porous shell 16 around it. The porous material of the so produced shell has a number of properties similar to those which characterize a product called "Thirsty Vycor," this term being used to designate a glass which as such is supplied as "porous glass" by Corning Glass Works of Corning, New York (makers of other related products, including that sold under the trademark "Vycor").

The etching or boron dissolving treatment, which gradually penetrates into the minute pores of the silica shell structure, is chemically even more aggressive than the above-mentioned baking in air. It has the result that previously oxidized surface portions of the exposed filament ends are removed, leaving the strip 17 in reduced condition insofar as said ends are concerned. However, the formerly established firm bond between this strip and the glass is retained within the glass grain, at least within the solid core 15 thereof. (If for instance molybdenum is used as filament materials, adequate phase separating and etching of the glass oxidizes and then removes so much of the exposed metal that a relatively thick filament would be required in order to retain any exposed metal for use as a holder; and as already indicated, the entire miniature unit of filament and glass grain must then be made correspondingly larger, in order that a core of adequate size may still be provided. The situation is likely to be similar with tantalum and columbium. It is for these reasons that the use of tungsten is greatly preferred, particularly when the transistor, to be protected by the desiccator, must be able to withstand high degrees of vibration, shock and the like.)

A specific example of the new process can now be described as follows:

A spherical body of glass melt is formed, measuring 40 mils in diameter and consisting of 65% silica ($SiO_2$) with 26% boron oxide ($B_2O_3$) and 9% soda ($Na_2O$). This sphere is compacted around a wire of tungsten (W), which has for instance 5 mils cross sectional diameter, this wire having end portions of for instance about 60 mils (1/16 inch) length projecting from the sphere. Fusion of the glass materials is produced at a temperature of approximately 1200° C. In the absence of soda the fusion temperature is higher and it becomes more difficult, even when using tungsten, to maintain suitable, solid filament structure.

The unit is then baked for 20 hours at about 650° in a nitrogen atmosphere.

Thereafter the unit is immersed in a suitable bath or baths. It is preferred to immerse it first for 2 minutes in a bath of hydrofluoric acid (HF) of 5% strength to dissolve a coating of boron oxide and alkali, volatilized from and condensed on the granule during phase separation. Thereafter the unit is immersed in hydrochloric acid (HCl) of 3 N strength, saturated with ammonium chloride ($NH_4Cl$). It is kept in this strong solution for 8 hours; this produces porosity in a shell portion of the sphere, approximately 13 mils thick. The silica content of the shell is then very high, such for instance as at least about 95% or sometimes 96%.

Thereafter the unit is rinsed in purified water for 16 hours and vacuum baked at about 300° C. for 1 hour. This baking, which makes the surface portion thereof "thirsty," completes the preparation of the desiccant grain or granule.

The foregoing specific data are given as an example only; a number of modifications can be used, which will readily occur to persons skilled in the art, on consideration of this disclosure.

The completed desiccant granule can be stored if care is taken to protect it from contact with humidity and other contaminants, for instance by storing it in a suitable partial vacuum.

At the earliest possible moment the unit is then installed in the transistor housing 19 to be protected thereby. One type of such a housing is illustrated in FIG. 6. A transistor 20 is here shown as being mounted on a base tab 21 secured to a vertical lead 22, said lead extending through a glass stem 23 which forms a lower portion of housing 19. A hat 24, formed for instance of copper, provides an upper portion of this housing. Electrode whiskers 25, 26 of the transistor are connected to further leads 27, 28, which extend vertically through glass stem 23.

The space in housing 19 is largely occupied by the so-identified elements 20 to 28, but sufficient room is left within hat 24 to insert a small desiccant grain 14 on at least one side of the transistor. For this purpose at least one end of support strip 17 is secured to the inside of the hat, for instance by cold welding, and the other end 29 may be suitably bent to allow similar fastening to an upper portion of the hat, now shown.

In order to make transistor housing 19 as small as possible it is important that hat 24, with glass grain 14 fastened therein, be oriented properly with respect to the various parts, such as transistor 20 on stem 23, for otherwise assembly of the complete transistor unit would become impossible. It is therefore preferred that hat 24 be provided with suitable means for orienting it relative to stem 23, for instance with a mark 30 on flange 31 of the hat, in registry with a similar mark, not shown, on flange 32 of stem 23.

Installation of the new desiccant unit in the transistor housing has the effect and advantage that even the slightest trace of humidity is withheld from the transistor, throughout the use and life of the same, and that the transistor is, moreover, protected from contamination by breaking loose of solid dust particles. This can generally be achieved without enlargement of the transistor housings which are otherwise required.

While only a single embodiment of the product and a single way of carrying out the fabricating process have been illustrated and described, the details thereof are not to be construed as limitative of the inventive concept, except insofar as is consistent with the scope of the following claims.

We claim:
1. A miniature desiccator comprising a single granule of glass on a filament of metal, said granule comprising a porous silica lattice shell and a non-porous core of phase-separated borosilicate, said filament being firmly bonded to said core and extending through and from said shell.
2. As a desiccant device for a semiconductor unit to be enclosed in a capsule: a small body of glass having minutely porous surface structure of at least about 95% silica content, and a strip or wire of metal having one portion of its length secured to the inside of said capsule and another portion thereof extending into said body of glass to a depth beyond said porous surface structure, said metal having its melting point above the temperature at which said glass is originally fused.

3. A vitreous body, comprising a borosilicate core and a porous high silica shell on said core.

4. As an article of the indicated type: a vitreous body on an elongate metallic holder, said vitreous body consisting of phase separated constituents including silica, with porous surface structure of high silica glass, and said holder consisting of a mechanically strong and chemically highly inert metal, being held in an inner portion of said vitreous body and extending to the outside of said surface structure.

5. An article as described in claim 4 wherein said holder consists of a metal selected from the group comprising tungsten, tantalum, columbium and molybdenum.

6. An article as described in claim 5 wherein said holder consists of tungsten.

7. In a semiconductor device: a semiconductor unit comprising whisker and lead structure; a stem and hat structure closely surrounding said unit and leaving a small area unoccupied between parts of said structures; a granule of glass substantially occupying such area, said granule comprising a porous surface structure and a non-porous core; and a filament of metal extending through said core and having at least one end secured to the inside of said hat.

8. A method of forming a miniature desiccant unit comprising the steps of fusing a grain of glass of the borosilicate type onto a filament of mechanically strong and chemically highly inactive metal, in such a way that said filament extends into a surface portion of said grain and further into a central portion thereof; baking said grain with said filament; and then leaching non-siliceous material from the surface portion but not from the central portion of said grain.

9. A method as described in claim 8 wherein said glass also contains a small amount of alkali.

10. A method as described in claim 8 wherein said fusing is performed at about 1200° C.

11. A method as described in claim 8 wherein said baking is performed at about 650° C.

12. A method as described in claim 8 wherein said leaching is substantially performed with strong hydrochloric acid.

13. A method as described in claim 8 wherein said metal is tungsten.

14. A method as described in claim 8 wherein said metal is molybdenum and said baking is performed in a neutral atmosphere.

15. In a method of fabricating a semiconductor unit: assembling a semiconductor device on a stem so as to leave small areas of the stem unoccupied by the device; assembling a hat with a desiccant device therein, by attaching one part of a metal filament to the inside of a glass grain having a porous high silica surface and by attaching another part of said filament to the inside of said hat; and then assembling the hat with the stem in such orientation that said glass grain fits into one of said areas.

No references cited.